United States Patent [19]
Skidmore

[11] Patent Number: 5,316,334
[45] Date of Patent: May 31, 1994

[54] AIR BAG RESTRAINT SYSTEMS

[75] Inventor: Gerald P. Skidmore, Nuneaton, United Kingdom

[73] Assignee: Jaguar Cars Limited, United Kingdom

[21] Appl. No.: 892,265

[22] Filed: Jun. 2, 1992

[30] Foreign Application Priority Data

Jun. 5, 1991 [GB] United Kingdom ............ 9112063

[51] Int. Cl.⁵ .............................. B60R 21/16
[52] U.S. Cl. ................. 280/728 B; 280/732
[58] Field of Search ......... 280/728, 730, 731, 732, 280/752, 728 B, 728 A; 296/70

[56] References Cited

U.S. PATENT DOCUMENTS

| | | |
|---|---|---|
| 3,708,179 | 1/1973 | Hulten . |
| 4,773,673 | 9/1988 | Sakurai ............... 280/728 B |
| 4,893,833 | 1/1990 | DiSalvo et al. ....... 280/728 B |
| 4,989,846 | 2/1991 | DiSalvo et al. ....... 280/728 B |
| 5,002,307 | 3/1991 | Heidorn ................. 280/731 |
| 5,035,444 | 7/1991 | Carter .................. 280/728 B |

FOREIGN PATENT DOCUMENTS

| | | |
|---|---|---|
| 0363986 | 4/1990 | European Pat. Off. . |
| 0482389 | 4/1992 | European Pat. Off. . |
| 3743415 | 6/1988 | Fed. Rep. of Germany . |
| 3800652 | 7/1988 | Fed. Rep. of Germany . |
| 0050054 | 2/1992 | Japan .................. 280/728 B |

*Primary Examiner*—Margaret A. Focarino
*Attorney, Agent, or Firm*—Davis, Bujold & Streck

[57] ABSTRACT

A cover for an airbag module of an air bag restraint system is formed by a single door which is mounted in front of the air bag module about horizontal pivots, the horizontal pivots are disposed on an axis positioned intermediate of the horizontal edges of the door, so that upon opening of the door a portion of the door will move to the air bag module side of the pivot axis thereby reducing the extent to which the door extends to the other side of the pivot axis when open, fastening means being provided to maintain the door in its closed position, until a predetermined load is applied thereto upon expansion of the air bag.

8 Claims, 3 Drawing Sheets

AIR BAG RESTRAINT SYSTEMS

BACKGROUND TO THE INVENTION

The present invention relates to improvements in and relating to air bag restraint systems.

In air bag restraint systems, the air bags are located behind covers formed in trim panels, so that upon inflation of the air bag, the bag will burst through the cover and be deployed in front of the occupant of the vehicle.

It is desirable that upon inflation of the air bag, the parts of the burst cover will remain attached to the trim panel, so that they will not fly off and cause possible injury to the occupants of the vehicle. Furthermore, it is important that the burst parts of the cover do not intrude significantly into the passenger compartment as this again may present a hazard to the occupants, during a collision.

Hitherto, it has been proposed to form the cover from a pair of horizontally hinged doors, one door hinged along its upper edge and the other along its lower edge, a frangible seam being provided between the two doors which upon inflation of the bag will fracture to permit the doors to open by pivoting along their hinges. According to one form of construction proposed, an aluminium pressing defines the frangible seam and hinge formations for the doors, suitable facia panels being applied to the aluminium pressing. However, due to the necessarily weakened nature of the frangible seam and hinge formations, the aluminium pressing forms a frail construction and requires supporting jigs during application of the trim facia and installation into the vehicle.

Furthermore, the formation of the cover from a pair of doors requires a trim finisher to cover the central seam which places restraints upon the final appearance of the facia.

SUMMARY OF THE INVENTION

According to one aspect of the present invention, a cover for an air bag module of an air bag restraint system comprises a single door adapted to be mounted in front of the air bag module about horizontal pivots, the horizontal pivots being disposed on an axis positioned intermediate of the horizontal edges of the door, so that upon opening of the door, a portion of door will move to the air bag module side of the pivot axis, thereby reducing the extent to which the door extends to the other side of the pivot axis when open, means being provided to maintain the door in its closed position until a predetermined load is applied thereto upon expansion of the air bag.

The present invention thereby provides a cover for an air bag module comprising a single door, the increased depth of door being accommodated by the pivotal arrangement to reduce penetration of the door into the passenger compartment. Use of a single door will also avoid the need for a central trim strip thereby providing greater scope for the design of the facia. Furthermore, as there is no central frangible seam or weakened hinge formations, the construction of the cover may be made more substantial avoiding the need for supporting jigs during manufacture and fitting to the vehicle.

According to a preferred embodiment, the pivot axis of the door in addition to being spaced from the horizontal edge of the door, is disposed rearwardly of the plane of the door, thereby further reducing intrusion of the door into the passenger compartment. In order to reduce intrusion of the door into the passenger compartment still further, a weakened horizontal seam may be provided which will permit the door to hinge at a position disposed between the pivot axis and the remote edge of the door.

The door may be retained in its closed position by means of a frangible seam which will burst upon expansion of the air bag. According to alternative embodiments, shear pins or like frangible fastening means may be secured between the door and a supporting frame, tags which will bend when an appropriate opening load is applied to the door may engage in recesses in the door or suitable frictional means may be associated with the door pivots. According to a further embodiment of the invention, the fastening means may be releasable to permit opening of the door to provide access to the air bag module.

BRIEF DESCRIPTION OF THE DRAWINGS

An embodiment of the invention is now described, by way of example only, with reference to the accompanying drawings, in which.

DESCRIPTION OF A PREFERRED EMBODIMENT

Figure 1:
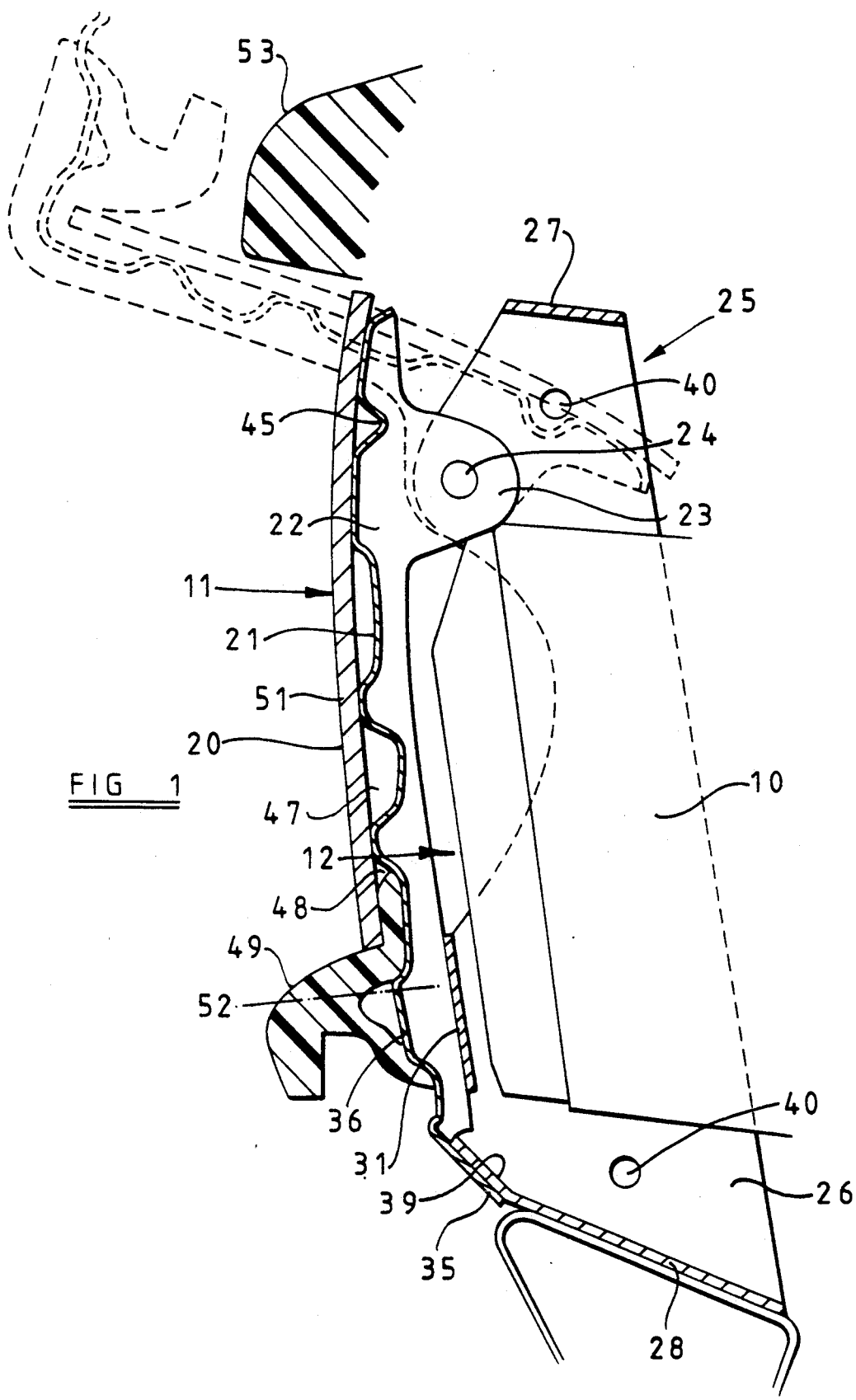
FIG. 1 is a sectional side elevation of a cover for an air bag module in accordance with the present invention.
Figure 2:
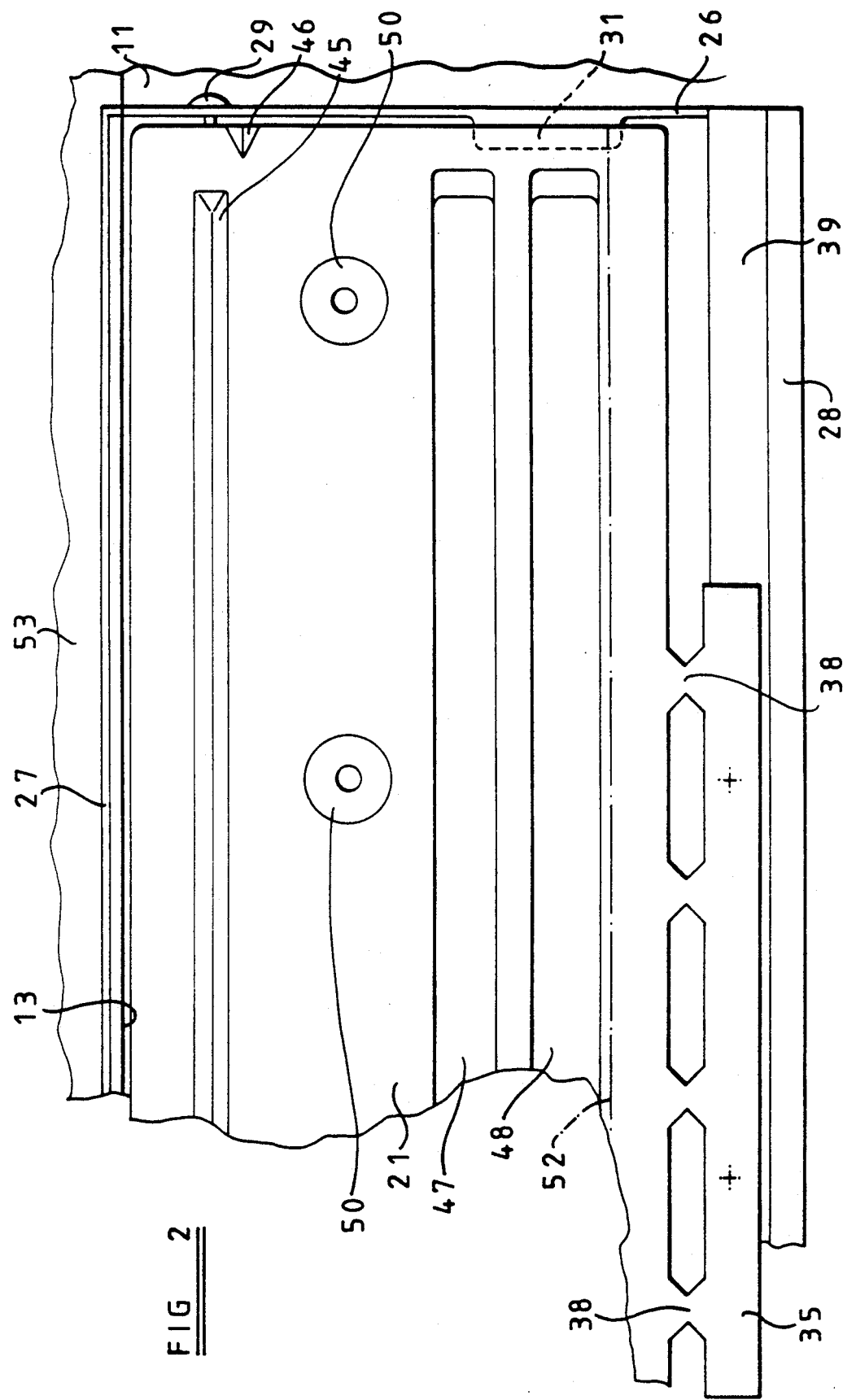
FIG. 2 is a partial front elevation of the cover illustrated in FIG. 1.
Figure 3:
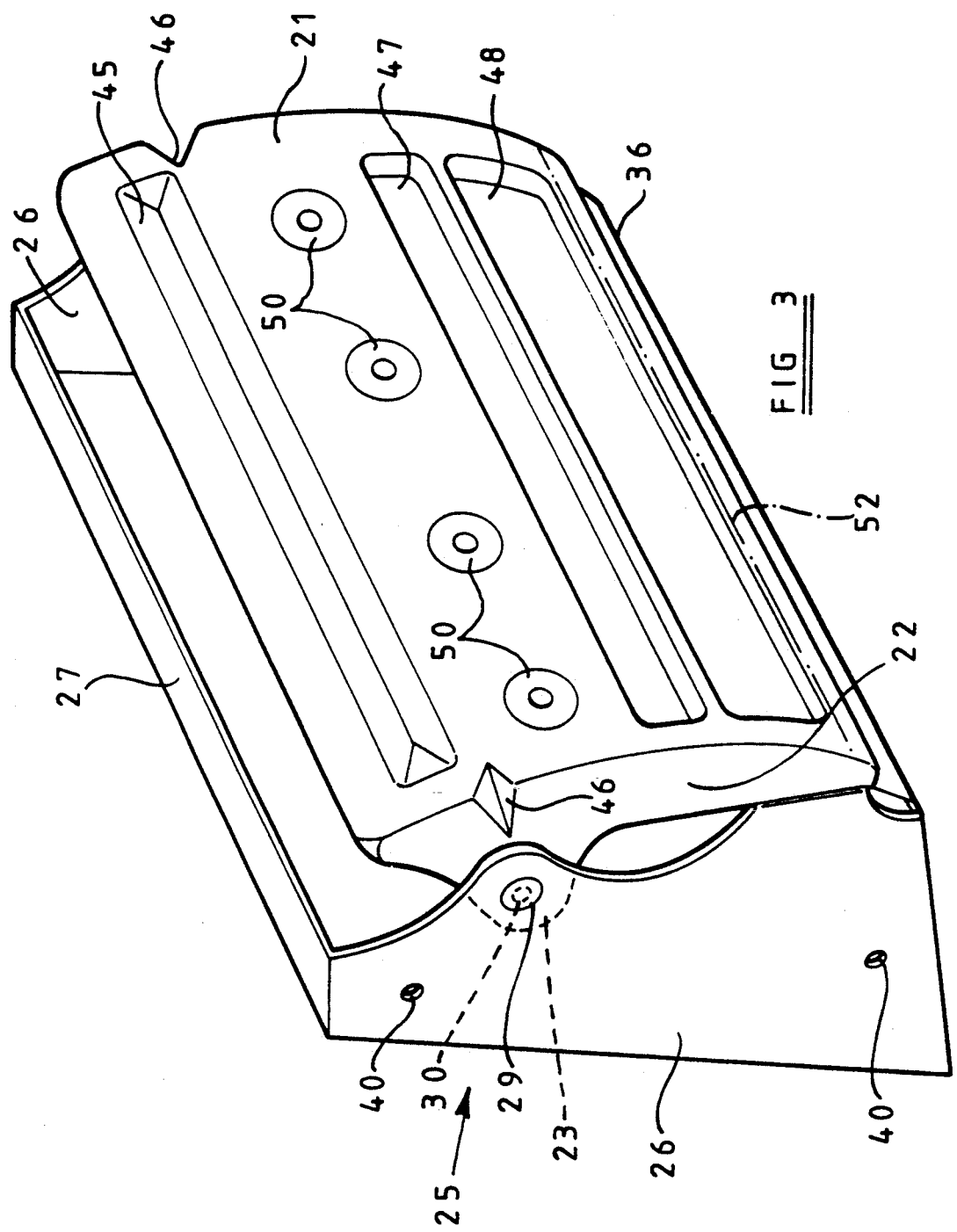
FIG. 3 is an isometric view of the cover illustrated in FIGS. 1 and 2.

As illustrated in the accompanying drawings, an air bag module 10 is located in front of the front passenger seat, behind the front facia 11 of a vehicle, for example, where the glove compartment of a conventional vehicle is typically located. The air bag module 10 has an aperture 12 through which the air bag is deployed during a collision. An aperture 13 is provided in the front facia 11 corresponding to the aperture 12 in the air bag module 10.

The aperture 13 is the full depth of the facia 11 and is closed by a door 20. The door 20 is formed from an aluminium pressing defining a front support panel 21 and a pair of rearwardly extending side flanges 22. A rearwardly extending portion 23 of each flange 22 defines a pivot aperture 24, the pivot apertures 24 being co-axial, the axis being located intermediate of the top and bottom edges of the door 20 about one third of the depth of the door 20 down from the top edge thereof.

The door 20 is pivotally mounted in a frame 25 formed from a pair of uprights 26 interconnected by cross members 27 and 28, pivot pins 29 passing through the pivot apertures 24 and corresponding apertures 30 in the uprights 26.

The upper cross member 27 is set back from the front edge of the door 20. Flange formations 31 are provided adjacent to the lower edges of uprights 26, for abutment of the rear face of the door 20.

An aluminium strip formation 35 is provided along the lower edge 36 of the front support panel 21, the strip formation 35 being connected to the panel 21 by means of thin tab formations 38. The tab formations 38 are arranged to fracture when the air bag is inflated and the resultant pressure on the door 20 reaches a predetermined value, thereby permitting the door 20 to open and allowing the air bag to be deployed. The strip formation 35 is secured to a flange formation 39 on the lower cross member 28 of the frame 25.

Apertures 40 are provided in the uprights 26 of frame 25 by which it may be secured to the vehicle facia 11.

The front support panel 21 is formed with a reinforcing rib 45 to prevent bowing of the panel 21 when the air bag is inflated. "Duck Beak" notches 46 across the angle between the panel 21 and flanges 22 also strengthen the flanges 22. Recesses 47 and 48 are also provided in panel 21 by which sponge rubber shock absorbing mouldings 49 may be secured along the lower edge of panel 21 to provide protection against impact with the lower edge of the door 20 and also to cover the aluminium strip 35 and tab formation 38 when the door 20 is closed. Fastenings 50 are also provided on the panel 21 by which a wooden facia 51 may be secured thereto.

A weakened horizontal seam as indicated by a broken line 52 may be provided adjacent the lower edge of the panel 21 by for example reducing the thickness of the aluminium along that line or by providing a series of apertures therealong, the flange formations 22 also being weakened at this point.

Normally, the door 20 when fitted will be maintained in its closed position by means of the tab formations 38 and strip formation 35. However, when the vehicle is in a collision, the air bag will be inflated and will press against the inside of the door 20 until sufficient pressure is produced to fracture the tab formations 38. The door 20 will then be free to open, pivoting upwardly about pivot pins 29, the upper part of the door 20 moving away from the vehicle compartment into the space behind the facia 11, as illustrated in broken line in FIG. 1. Projection of the door 20 into the passenger compartment is thereby significantly reduced. When the door 20 has opened to its fullest extent, which may be limited by abutment of the upper part of the door 20 against the air bag module 10 or engagement of the lower part of the door 20 against the crash roll 53 which is provided along the top edge of the facia 11, further expansion of the air bag will cause the door 20 to bend along the weakened line 52, thereby reducing even further the penetration of the door 20 into the passenger compartment.

In place of the aluminium strip formation 35 and tab formations 38, shear pins may be located between the door 20 and frame 25. These shear pins may be located along the bottom and/or side edges of the door, the number and strength of the pins permitting them to shear when the appropriate load is applied to the door 20 by inflation of the air bag. Alternatively tabs may be provided on the frame member 25 so that they will engage in recesses in the edge of the door 20, the tabs being arranged to bend and permit opening of the door 20, when an appropriate load is applied to the door 20 by inflation of the air bag. The aluminium strip 35, shear pins or other means of securing the door in the closed position, may be secured to the frame 25 or to other adjacent structural members, by permanent securing means. Alternatively, releasable securing means may be used so that the door 20 may be opened in order to provide access to the air bag module. In an alternative embodiment, frictional means may be associated with the pivots to retain the door in the closed position but permit opening of the door when a load in excess of a predetermined magnitude is applied thereto, for example upon inflation of the air bag.

Various modifications may be made without departing from the invention. For example, while in the above embodiment the door 20 is pivoted with respect to the frame adjacent its upper edge so that upon opening it will pivot upwardly, the door may alternatively be pivoted adjacent its lower edge so that it pivots downwardly upon opening.

While in the above embodiments the door 20 and frame 25 are formed from aluminium, any suitable material may be used, for example the door support panel 21 and flanges 22, and the frame 25 may be moulded from a suitable plastics material. Any suitable finishing trim may be applied to the support panel 21.

I claim:

1. A cover for an air bag module of an air bag restraint system, the air bag module being adapted to be mounted behind a vertically extending portion of a facia of a vehicle, an aperture being provided in the vertically extending portion of the facia to permit deployment of the air bag in front of an occupant of the vehicle, the cover comprising a frame mounted with respect to the facia on a side thereof adjacent the air bag module so that the frame surrounds the aperture, a door having two vertical edges and being pivotally mounted with respect to the frame for movement about a horizontal axis by means of a pair of pivot pins each pivot pin extending between a flange extending rearwardly from each of the vertical edges of the door and an adjacent vertical side member of the frame, said pivot pins being located part way along the vertical edges of the door and rearwardly of a plane of the aperture; and means being provided to maintain the door in a position in which the door closes the aperture until a predetermined load is applied thereto upon expansion of the air bag.

2. A cover according to claim 1 in which portions of the flanges extending from the vertical edges of the door extend further towards the air bag module and are provided with apertures for the pivot pins.

3. A cover according to claim 1 in which the frame has abutment means for engagement of the door on the side adjacent the air bag module when in its closed position.

4. A cover according to claim 1 in which when in its closed position, the door is secured to the frame by frangible means.

5. A cover according to claim 4 in which the door is secured to the frame by means of a strip defining a frangible seam.

6. A cover according to claim 5 in which the frangible seam is defined by a series of linearly spaced frangible tab formations.

7. A cover according to claim 1 in which a weakened horizontal seam is provided across the door between the pair of pivot pins and an edge of the door remote from the pivot pins allowing parts of the door to bend along a seam when the air bag is deployed.

8. A cover according to claim 1 in which facia trim is applied to the front face of the door.

* * * * *